(12) United States Patent
Kuo et al.

(10) Patent No.: US 8,270,102 B2
(45) Date of Patent: Sep. 18, 2012

(54) LENS DEVICE AND IMAGE CAPTURING DEVICE HAVING SAME

(75) Inventors: Yuan-Lung Kuo, Taipei Hsien (TW); Wei-Lun Han, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 209 days.

(21) Appl. No.: 12/900,494

(22) Filed: Oct. 8, 2010

(65) Prior Publication Data

US 2011/0304931 A1    Dec. 15, 2011

(30) Foreign Application Priority Data

Jun. 11, 2010    (CN) .......................... 2010 1 0198368

(51) Int. Cl.
*G02B 7/02* (2006.01)

(52) U.S. Cl. ........................................ 359/819; 359/811
(58) Field of Classification Search .................. 359/819, 359/822–824
See application file for complete search history.

*Primary Examiner* — Ricky Mack
*Assistant Examiner* — Mahidere Sahle
(74) *Attorney, Agent, or Firm* — Altis Law Group, Inc.

(57) ABSTRACT

A lens device includes a lens assembly, a lens barrel receiving the lens assembly therein and a barrel holder. The lens barrel includes a first end, an opposite second end, a first flange extending outwards from the first end, and a second flange extending outwards from the second end. The barrel holder is located between the first flange and the second flange. The barrel holder includes a first part, a second part, and two pairs of magnetic units each including a first magnetic element fixed to one of the first part and the second part, and a second magnetic element fixed to the other of the first part and the second part, the second magnetic element magnetically attracted to the first magnetic element. The first part is securely attached to the second part by magnetic attraction between the first and second magnetic elements.

14 Claims, 5 Drawing Sheets

LENS DEVICE AND IMAGE CAPTURING DEVICE HAVING SAME

BACKGROUND

1. Technical Field

The present disclosure relates to a lens device and an image capturing device having the lens device.

2. Description of Related Art

Image capturing devices have been widely used in handheld electronic devices, such as mobile phones. A typical image capturing device usually includes a lens device and an image sensor module aligned with the lens device. The lens device may include a lens assembly, a lens barrel receiving the lens assembly, and a barrel holder. The barrel holder is usually threadedly engaged with the lens barrel, and holds the entire lens device.

However, the molding or machining of the threads is difficult, and the precision of the threads is critical for the precision of the entire lens device and image capturing devices.

What is needed, therefore, is a lens device and an image capturing device, which can overcome the above shortcomings.

BRIEF DESCRIPTION OF THE DRAWINGS

Many aspects of the present lens device and image capturing device can be better understood with reference to the following drawings. The components in the drawings are not necessarily drawn to scale, the emphasis instead being placed upon clearly illustrating the principles of the present lens device and image capturing device. Moreover, in the drawings, like reference numerals designate corresponding parts throughout the several views.

DETAILED DESCRIPTION

Embodiments of the present lens device and image capturing device will now be described in detail below and with reference to the drawings.

Figure 1:
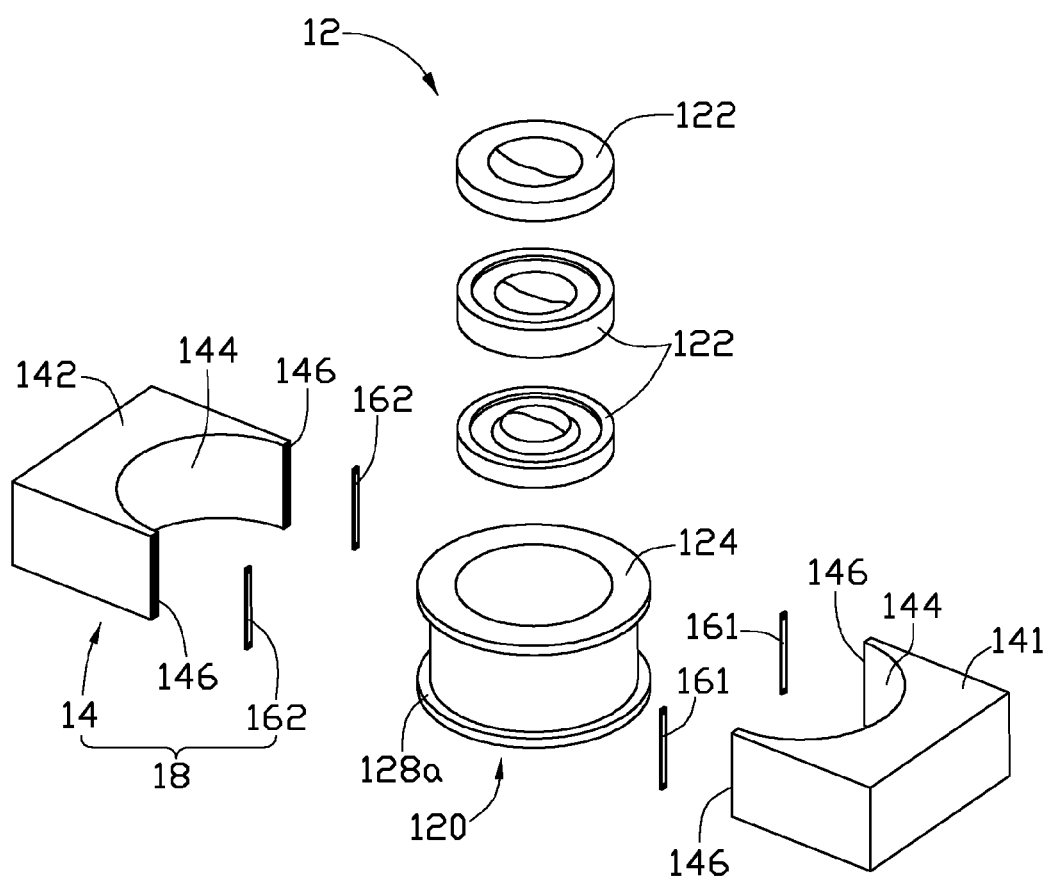
FIG. 1 is an exploded view of a lens device in accordance with one embodiment, the lens device has a barrel holder.
Figure 2:
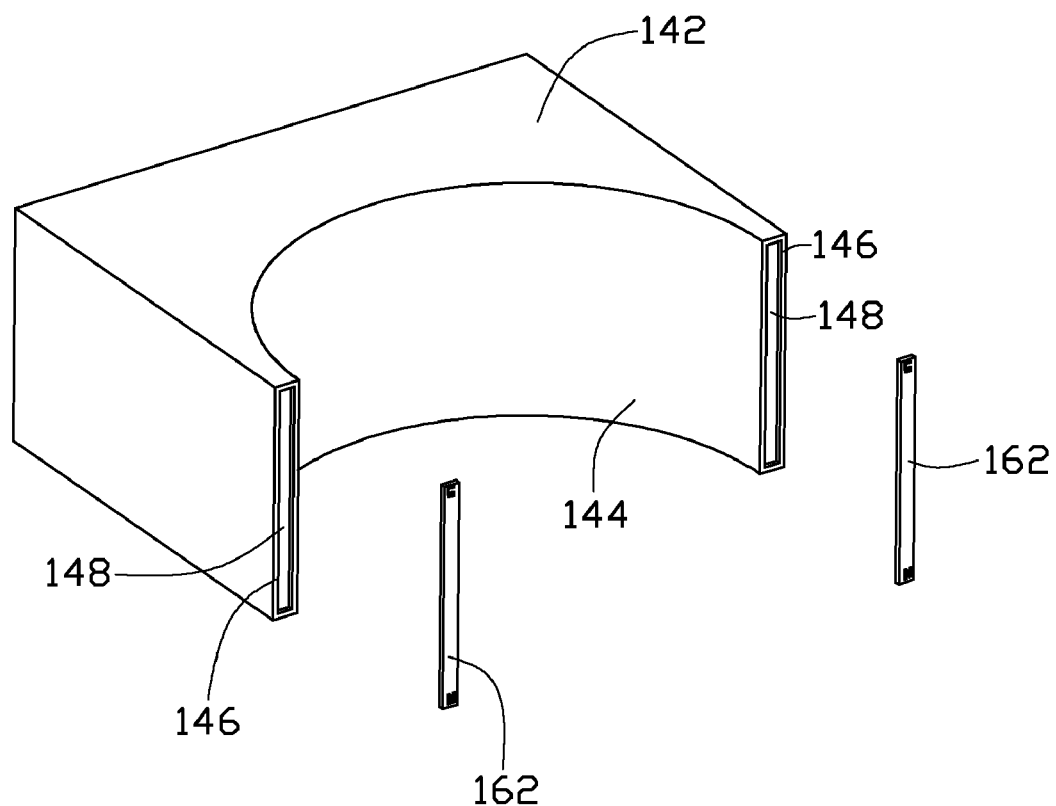
FIG. 2 is an enlarged view of a part of the barrel holder shown in FIG. 1.

Referring to FIGS. 1 and 2, an exemplary lens device 10 in accordance with one embodiment is provided. The lens device 10 includes a lens assembly 12, a lens barrel 120 receiving the lens assembly 12 therein, and a barrel holder 18.

In the present embodiment, the lens assembly 12 includes three lenses 122. The lens barrel 120 includes a first circular flange 124 extending outwards from the first end, and a second and a third circular flanges 128a, 128b defined at an opposite second end thereof. The second flange 128a extends outwards from the second end, and the third flange 128b extends inwards from the second end. The third flange 128b defines a light incident opening 128c (see FIG. 4), and the third flange 128b can serve as a retaining portion for the lens assembly 12.

Figure 3:
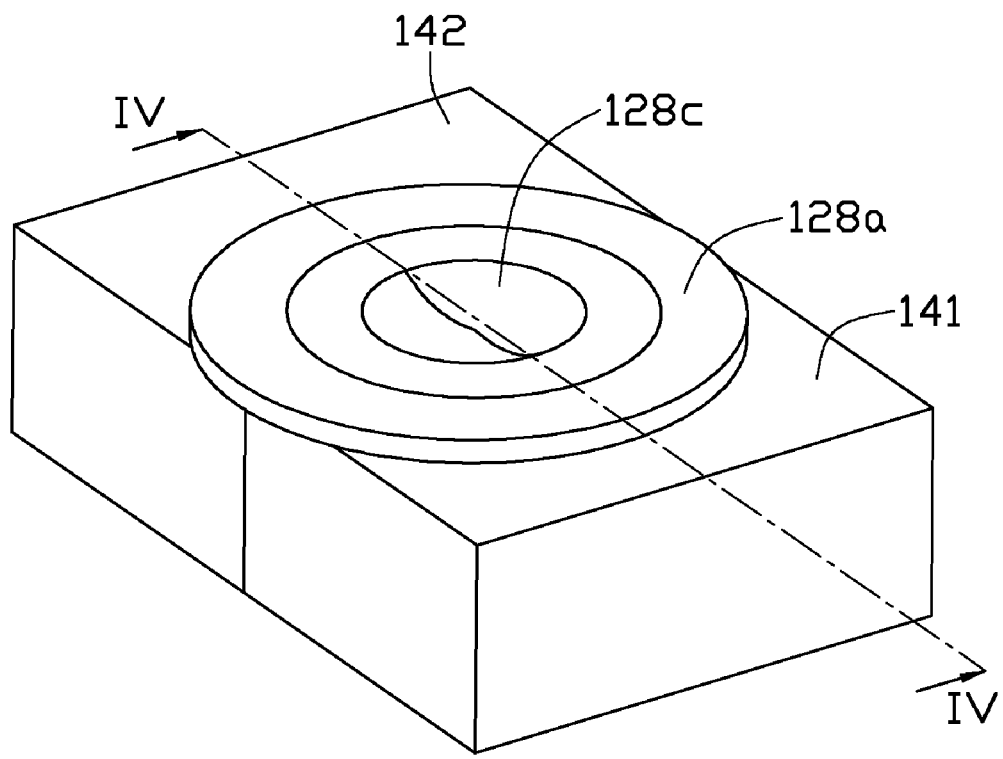
FIG. 3 is an assembled view of the lens device of FIG. 1.
Figure 4:
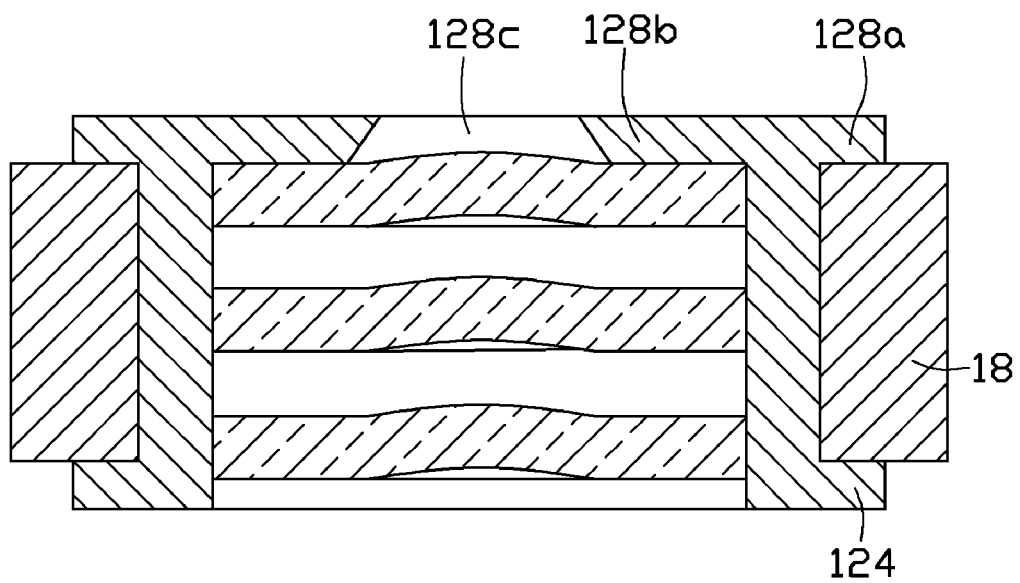
FIG. 4 is a cross sectional view of the lens device of FIG. 3, taken along line

Referring to FIGS. 3 and 4, the barrel holder 18 is received between the first flange 124 and the second flange 128a. The barrel holder 18 includes a main body 14, two first magnetic elements 161 and two second magnetic elements 162. The main body 14 includes a first part 141 and a second part 142 arranged opposite to the first part 141. In the present embodiment, the first part 141 is the same as the second part 142. Both the first part 141 and the second part 142 have a semi-circular inner surface 144, and first part 141 and the second part 142 cooperatively form a circular through hole (not labeled) with a diameter of which is substantially the same as or a little larger than an outer diameter of the lens barrel 120.

Referring again to FIG. 2, both the first part 141 and the second part 142 include two side surfaces 146 defined at two ends of the semi-circular surface 144. Each of the side surfaces 146 has a groove 148 formed therein, and the groove 148 receives one of the first and second magnetic elements 161 and 162.

In the present embodiment, both the first and second magnetic elements 161 and 162 is in a bar shape. One of the first magnetic elements 161 and one of the second elements 162 form a magnetic unit and are arranged adjacent to each other. The first magnetic element 161 and the second magnetic element 162 of the magnetic unit can be magnetically attracted to each other. With this configuration, the first part 141 and the second part 142 can be securely attached to each other, and the barrel holder 18 is formed. Conventional thread engagement can be avoided in the barrel holder 18.

Figure 5:
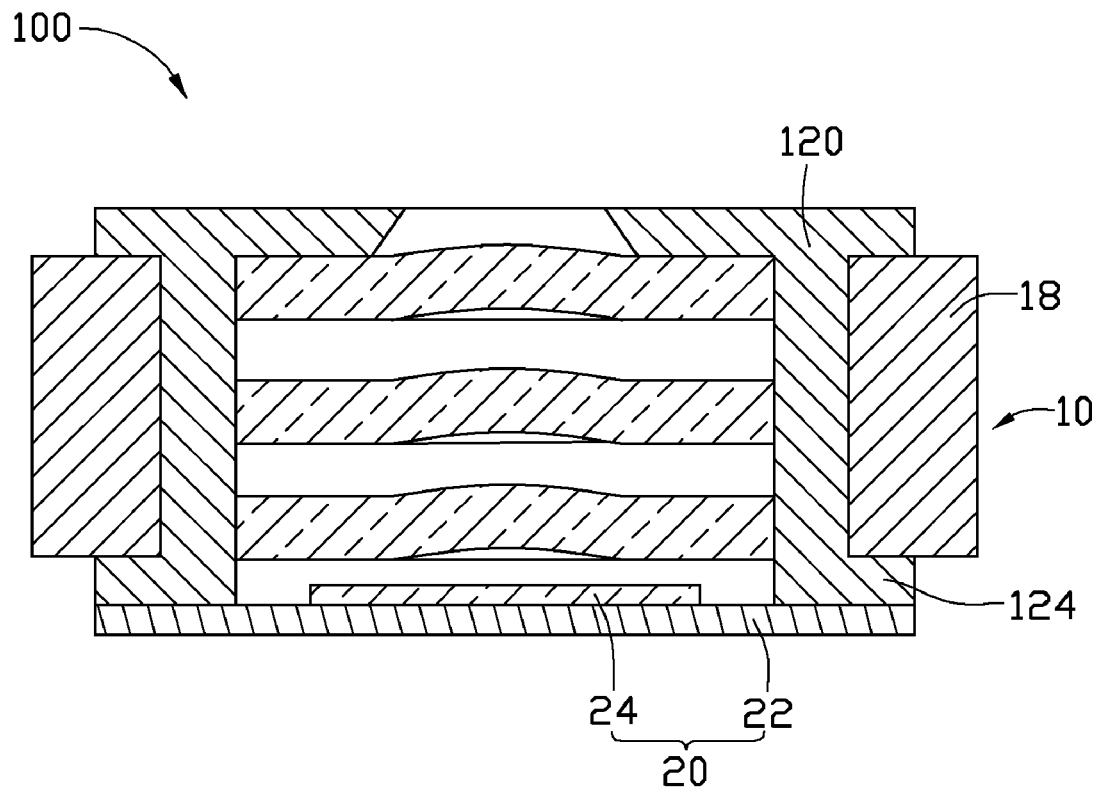
FIG. 5 is a sectional view of an image capturing device in accordance with one embodiment.

Referring to FIG. 5, an exemplary image capturing device 100 in accordance with an embodiment is provided. The image capturing device 100 includes a lens device 10 and an image sensor module 20. The image sensor module 20 includes a circuit board 22 and an image sensor 24 mounted on the circuit board 22. The image sensor 24 is received in the first end of the lens barrel 120. The circuit board 22 is mounted on the first circular flange 124 of the lens barrel 120.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A lens device, comprising:
a lens assembly;
a lens barrel receiving the lens assembly therein, the lens barrel comprising a first end, an opposite second end, a first flange extending outwards from the first end, and a second flange extending outwards from the second end; and
a barrel holder located between the first flange and the second flange, the barrel holder comprising a first part, a second part, and two pairs of magnetic units each including a first magnetic element fixed to one of the first part and the second part, and a second magnetic element fixed to the other of the first part and the second part, the second magnetic element magnetically attracted to the first magnetic element, the first part being securely attached to the second part by magnetic attraction between the first and second magnetic elements.

2. The lens device of claim 1, wherein each of the first and second parts comprises a semi-circular inner surface facing the lens barrel.

3. The lens device of claim 2, wherein each of the first and second parts comprises two side surfaces defined at two ends of the semi-circular inner surface, and each of the side surfaces has a groove formed therein, for receiving one of the first and second magnetic elements.

4. The lens device of claim 3, wherein the two pairs of the magnetic units are arranged at opposite sides of the lens barrel.

5. The lens device of claim 3, wherein each of the first and second magnetic elements is in a bar shape.

6. The lens device of claim 1, wherein each of the first and second flanges is circular.

7. The lens device of claim 1, wherein the lens barrel further comprises a third flange extending inwards from the second end, the third flange defining a light incident opening therein and configured for retaining the lens assembly.

8. An image capturing device, comprising:
a lens device comprising:
a lens assembly;
a lens barrel receiving the lens assembly therein, the lens barrel comprising a first end, an opposite second end, a first flange extending outwards from the first end, and a second flange extending outwards from the second end, the first end having a light incident opening defined therein; and
a barrel holder located between the first flange and the second flange, the barrel holder comprising a first part, a second part, and two pairs of magnetic units each including a first magnetic element fixed to one of the first part and the second part, and a second magnetic element fixed to the other of the first part and the second part, the second magnetic element magnetically attracted to the first magnetic element, the first part being securely attached to the second part by magnetic attraction between the first and second magnetic elements; and
an image sensor module comprising an circuit board mounted on the first flange of the lens barrel, and an image sensor mounted on the circuit board and received in the first end of the lens barrel.

9. The image capturing device of claim 8, wherein each of the first and second parts comprises a semi-circular inner surface facing the lens barrel.

10. The image capturing device of claim 9, wherein each of the first and second parts comprises two side surfaces defined at two ends of the semi-circular inner surface, and each of the side surfaces has a groove formed therein, for receiving one of the first and second magnetic elements.

11. The image capturing device of claim 10, wherein the two pairs of the magnetic units are arranged at opposite sides of the lens barrel.

12. The image capturing device of claim 10, wherein each of the first and second magnetic elements is in a bar shape.

13. The image capturing device of claim 8, wherein each of the first and second flanges is circular.

14. The image capturing device of claim 8, wherein the lens barrel further comprises a third flange extending inwards from the second end, the third flange defining the light incident opening therein and configured for retaining the lens assembly.

* * * * *